United States Patent
Torben

(10) Patent No.: US 9,769,429 B2
(45) Date of Patent: Sep. 19, 2017

(54) CONTROL SYSTEM FOR CABLES OR SIMILAR

(71) Applicant: ROLLS-ROYCE MARINE AS, Ålesund (NO)

(72) Inventor: Sverre Rye Torben, Langevåg (NO)

(73) Assignee: ROLLS-ROYCE MARINE AS, Ålesund (NO)

( * ) Notice: Subject to any disclaimer, the term of this patent is extended or adjusted under 35 U.S.C. 154(b) by 159 days.

(21) Appl. No.: 14/432,727

(22) PCT Filed: Nov. 1, 2013

(86) PCT No.: PCT/EP2013/072863
§ 371 (c)(1),
(2) Date: Mar. 31, 2015

(87) PCT Pub. No.: WO2014/068084
PCT Pub. Date: May 8, 2014

(65) Prior Publication Data
US 2015/0256797 A1    Sep. 10, 2015

(30) Foreign Application Priority Data

Nov. 2, 2012  (NO) .................................... 20121290

(51) Int. Cl.
*H04N 7/18*        (2006.01)
*B66D 1/36*        (2006.01)
(Continued)

(52) U.S. Cl.
CPC ........... *H04N 7/18* (2013.01); *B65H 54/2854* (2013.01); *B65H 54/2875* (2013.01); *B66D 1/36* (2013.01);
(Continued)

(58) Field of Classification Search
CPC combination set(s) only.
See application file for complete search history.

(56) References Cited

U.S. PATENT DOCUMENTS

| 4,106,335 A | * | 8/1978 | Shatto ..................... B63G 8/42 73/170.32 |
| 4,456,199 A | | 6/1984 | Seibert |

(Continued)

FOREIGN PATENT DOCUMENTS

| DE | 19726285 A1 | 12/1998 |
| DE | 19954072 A1 | 5/2001 |

(Continued)

OTHER PUBLICATIONS

Guthmuller, Jacques, "International Search Report," prepared for PCT/EP2013/072863, dated Jan. 7, 2014, five pages.

*Primary Examiner* — Sath V Perungavoor
*Assistant Examiner* — Janese Duley
(74) *Attorney, Agent, or Firm* — Winstead PC

(57) ABSTRACT

System for controlling the loading or unloading a cable [2] or the like onto a drum [3], wherein the drum [3] has a known first rotation axis loading or unloading the cable, the system also comprises an imaging means [1] aimed at the cable [2] from a position at a distance from the drum rotation axis, the imaging means [1] being adapted to measure the direction of the cable [2] relative to the rotational axis of the drum. The imaging means can be constituted by a video camera.

10 Claims, 4 Drawing Sheets

(51) Int. Cl.
 B65H 54/28 (2006.01)
 G06K 9/46 (2006.01)
 H04N 13/02 (2006.01)
 G06T 7/73 (2017.01)
 G06T 7/90 (2017.01)

(52) U.S. Cl.
 CPC .............. G06K 9/4652 (2013.01); G06T 7/73 (2017.01); G06T 7/90 (2017.01); H04N 13/02 (2013.01); *B65H 2701/35* (2013.01)

(56) References Cited

U.S. PATENT DOCUMENTS

| | | | | |
|---|---|---|---|---|
| 5,048,854 A | * | 9/1991 | Clark | B60D 1/38 280/477 |
| 5,154,561 A | * | 10/1992 | Lee | B63B 27/12 114/264 |
| 5,190,107 A | * | 3/1993 | Langner | B63B 39/00 166/355 |
| 6,443,385 B1 | * | 9/2002 | Grandauer | B65H 54/2875 242/476.7 |
| 6,523,806 B2 | | 2/2003 | Bartal | |
| 8,260,736 B1 | * | 9/2012 | Lear | G06N 5/02 706/46 |
| 8,462,581 B2 | * | 6/2013 | Langeland | G01V 1/3826 114/254 |
| 2002/0117654 A1 | | 8/2002 | Bartal | |
| 2012/0062558 A1 | * | 3/2012 | Lee | G06F 3/017 345/419 |
| 2012/0069005 A1 | * | 3/2012 | Seen | H04N 13/007 345/419 |
| 2012/0105613 A1 | * | 5/2012 | Weng | G01C 21/3664 348/77 |
| 2012/0300581 A1 | * | 11/2012 | Vahida | G01V 1/3817 367/16 |
| 2013/0238135 A1 | * | 9/2013 | Fisher | B66C 21/00 700/275 |

FOREIGN PATENT DOCUMENTS

| | | |
|---|---|---|
| JP | H07326367 | 12/1995 |
| JP | 2001267169 | 9/2001 |
| WO | WO-9618566 A1 | 6/1996 |
| WO | WO-2005031934 A1 | 4/2005 |

\* cited by examiner

CONTROL SYSTEM FOR CABLES OR SIMILAR

The present invention relates to a system for controlling the loading or unloading of a cable or the like onto a drum, e.g. using a winch. More specifically the invention relates to the use of using 3D Camera technology to locate the cable and to measure the angle of the cable onto the winch drum in winch installations on vessels doing seismic data collection at sea, and to compensate for this angle. Another related application for the same technology is to spool rope of wire onto a winch mounted on a crane structure. A third application of the technology is to for pure monitoring purposes, e.g. to detect the position and direction of a cable on the deck of an anchor handling vessel. This information could be used as part of a safety system for vessel stability calculations.

The problems related to cables being wound onto a drum at an angle deviating from a perpendicular direction is known and, also discussed in U.S. Pat. No. 6,523,806, although for a different use. Thus solutions have been discussed where the angle of the cable is detected and the drum is rotated to adjust the angle and improve the positioning of the cable on the drum. U.S. Pat. No. 6,523,806 suggests different means for providing this, including a matrix of light sensors and U.S. Pat. No. 4,456,199 describes a solution a camera is used for monitoring the winding of a material on a spool, while WO1996/018566 suggests the use of arms or pins with sensors to maintain the direction of the cable according to the drum.

The present invention is especially aimed at the use on ships and oilier floating vessels, where the movements of the cable is dynamic and the monitoring system needs to be robust. Thus neither the sensor matrix in U.S. Pat. No. 6,523,806 nor the sensor pins in WO1996/018566 is practical as they will be vulnerable to sea water, dirt from the cable, damage due to impact from the cable etc. Thus the object of the present invention is to provide a robust system being useable in harsh conditions at sea, while providing an accurate and reliable storage of cables on a drum or position monitoring of a cable. This is obtained using a system as described in the accompanying claims.

More specifically the preferred embodiment of the invention includes the following:

- Camera and image processing will provide accurate 3D measurements of positions and angles of the cable relative to the winch or in a selected reference system relevant for monitoring of position. The camera or imaging device may be a 2D camera providing the position and orientation of the cable in a plane, preferably parallel to the drum axis, but in order to increase the accuracy a 3D camera is used. The 3D camera per se is commonly available and will not be discussed here.
- Variations in cable appearance or lighting conditions will in close to all situations be handled through image acquisition techniques and image processing. In the present specification cable may also be understood as chain, wire, fibre rope, umbilical or similar.
- The cable angle sensor will provide valid data for controlling winch operation with high availability
- The Cable Location and Angle Measurement System may provide a system working day and night under difficult conditions.

The invention will be described below with reference to the accompanying drawings, illustrating the invention by way of examples.

FIG. 1. illustrates a configuration with drums, camera frame, camera box and cables in two sample positions FIG. 2 illustrates the view from the imaging means detecting the cable and cable positions.

In the practical solution for seismic studies the winches for seismic cable 2 handling are placed in the open on the rear deck of seismic vessels. Correct alignment of the cable onto the winch drum 3 is mission critical for the vessel, as damage to the cable or to the winch drum may give stops in the operation and extremely high costs.

The major reasons for measuring the cable angle onto the winch drum in this use are

- Avoid dragging the cable on the drum shield, as the pull force on the cable may damage the cable through unacceptable bending and rubbing of the cable.
- Automatic adjustment of winch angle when reeling the cable in to assure self-spooling on the drum.
- Always keep the winch at an optimum angle to the cable to avoid damage to the cable due to transverse movements on the drum.

On a seismic vessel the system is to be positioned on the rear deck which is in open air, exposed to sun, weather, seaspray, salt and moisture. The cable angle sensor installation must handle all of these conditions. These vessels are operated in all seas, from arctic operations in the Barents sea to hot and humid conditions around the equator. In addition the winch installation is subject to vibrations created by the vessel machinery and propeller. Vibrations may also occur in the cable. Also overhead onboard crane operations in the area of the rear deck may limit the accepted height above the winch structure.

The winch may rotate around its vertical axis to follow the movement of the cable during operation. Immediately in front of the winch, there may be a clear deck area of painted metal, giving a fairly homogeneous background when looking straight down. At extreme rotation angles, the outer wall of the deck or even the sea may be visible from a camera position.

According to one embodiment of the invention the system according to the invention may comprise of the following parts:

1. 3D Camera preferably providing robust 3D information based on 3D stereo-vision, communication with a computer using suitable cables. Camera chip size and lens focal length is selected based on the geometry of the installation. The camera and related technology such as illumination may be chosen according to the specific situation based on requirements such as contrast to the background, colour separation, resolution, depth of field, light intensity and field of view.

The different parts of the system should be easily exchangeable and weather sealed so as to withstand the conditions on the vessel.

Figure 1:
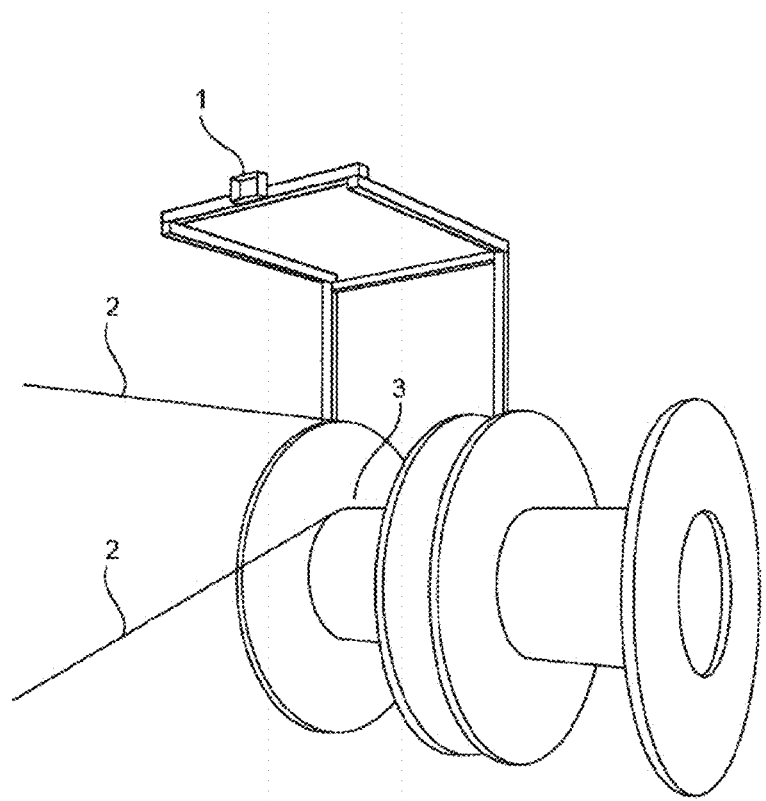

As may be seen from FIG. 1 the camera 1 is positioned with known position and orientation relative to the reference parameters of the system, such as the drum axis and the vertical axis of the platform, being in FIG. 1 chosen to be in the range of 3.3 m above and 2.4 m in front of a drum having a 3 m diameter These positions may be chosen manually on installation and verified by the system or measured automatically using routines not discussed in detail here. To provide accurate data, some kind of calibration reference object can be made for field calibration.

Two major parameters are contributing to the reliability of the shown measurement data:
1. Calibration and reference systems: The transformation from camera reference system to winch reference system may preferably be calibrated before use.
2. Reliability in detection of the cable: Software may be used for recognizing linear objects in the 2D or 3D images, possibly aided by the use of contrasting colours in the background. To ensure detection with varying cable colours an array of different and possibly alternating background colours may be used, e.g. alternating between black and white. Imaging software for increasing the contrast in specific colour ranges may also be applied.

Figure 2:
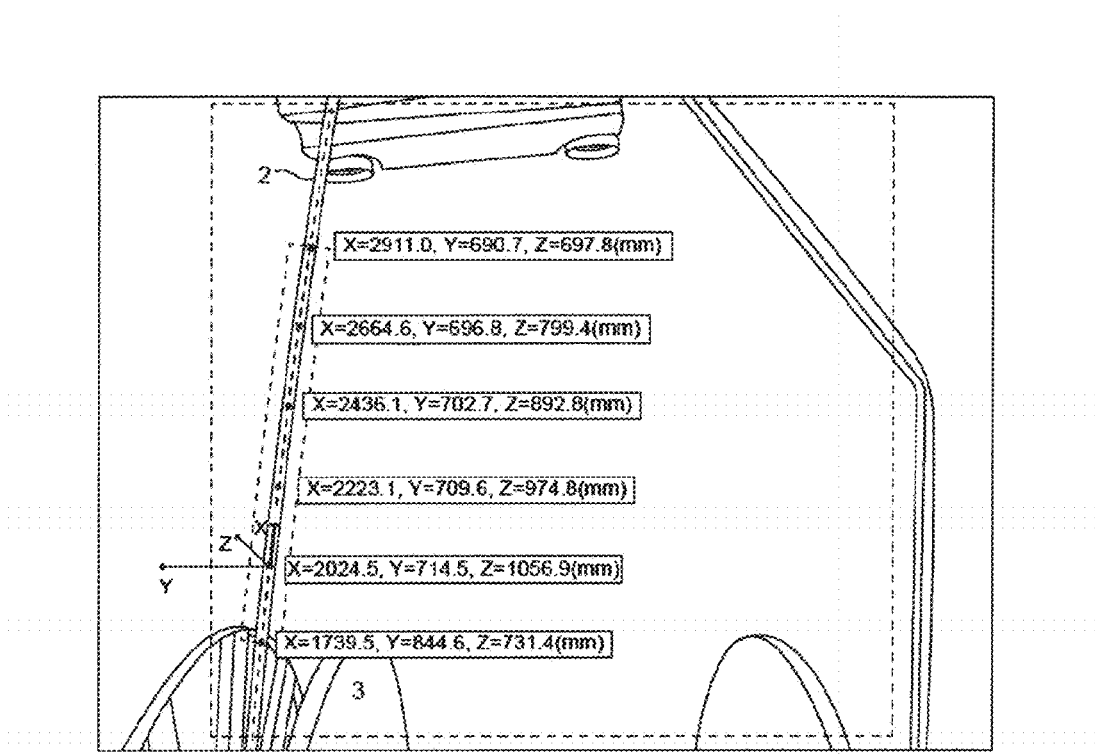

As is shown in FIG. 2 the imaging means will provide a measure of the coordinates of one or more parts of the cable related to the position of the winch or drum, thus providing a measure of the direction of the cable related to the winch axis. Preferably at least two sets of coordinates are provided so that the exact direction is provided.

When using two dimensional (2D) images in x,y coordinates a camera should be positioned so as to provide a view of the cable showing the direction of the cable in a plane perpendicular to the drum axis, thus e.g. being aimed downward from a position above the winch.

Providing a 3D image requires two cameras but may provide the direction of the cable in x,y,z coordinates and thus may be positioned more freely relative to the winch system. It may also be used to handle heave or other movements as it will provide the cable direction relative to the circumference of the drum.

Figure 3:
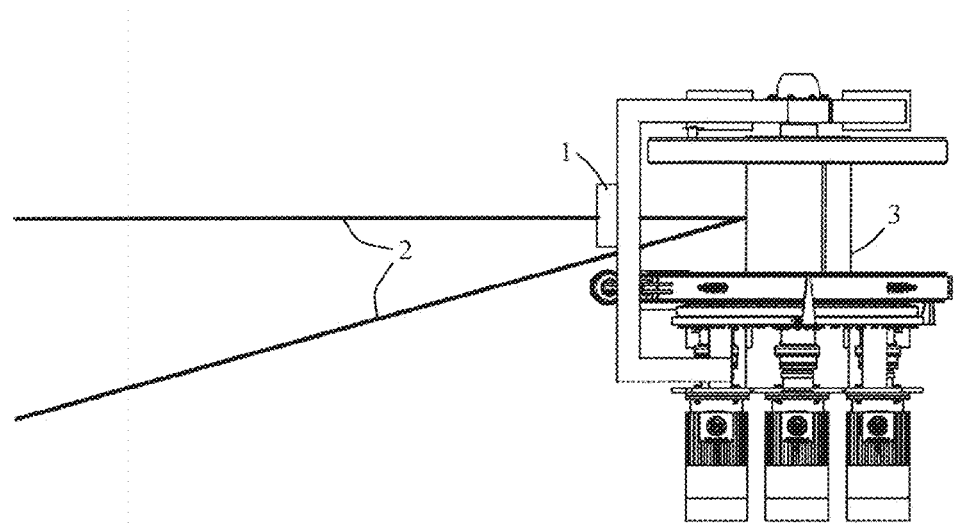
FIG. 3 illustrates an embodiment of the invention with a drum as seen from above.
Figure 4:
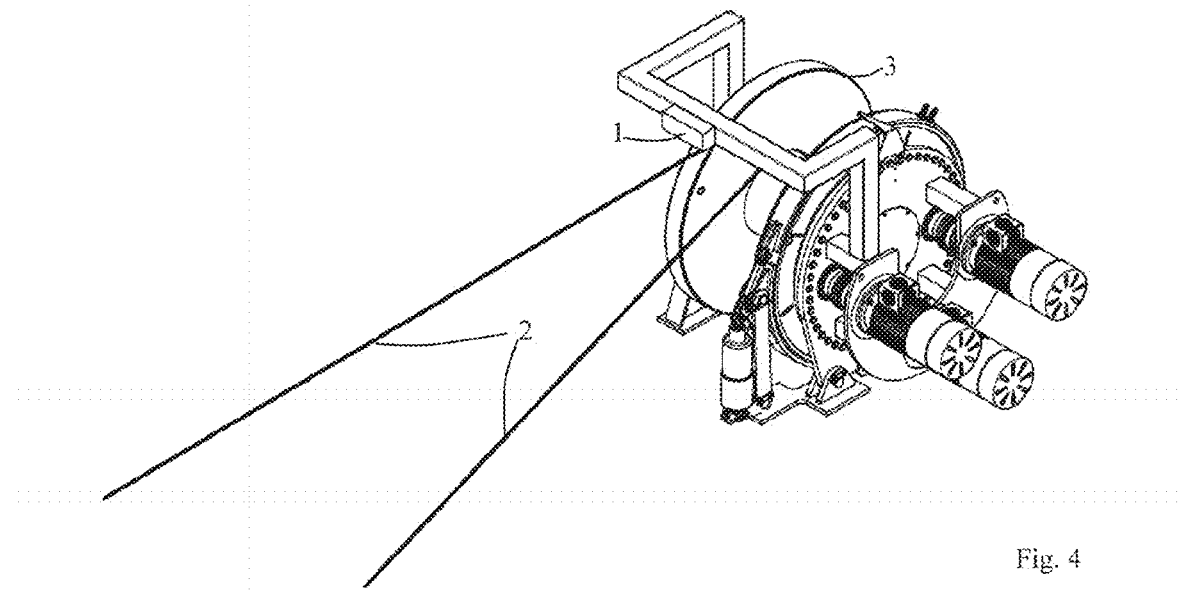
FIG. 4 illustrates a perspective view showing the embodiment front FIG. 3.

Referring to FIG. 3 the preferred embodiment of the invention is shown with a drum 3 as seen from above, where the cable 2 is shown in two positions, one essentially perpendicular to the drum axis and one having an angle relative to the drum. The camera 1 being positioned above will see the angle relative to the axis, and in the preferred embodiment providing a 3D image of the cable also the direction relative e.g. to the horizontal plane, as is evident in FIG. 4.

Figure 5:
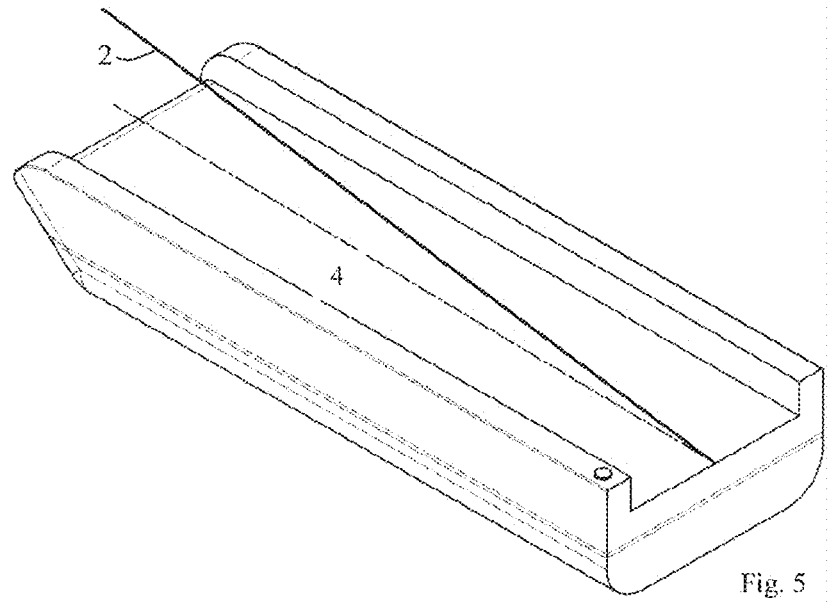
FIG. 5 illustrates the cable relative to a marked background surface according to an embodiment of the invention.

In a preferred embodiment as shown in FIG. 5 a background 4 for the cable 2 is provided with a contrasting colour, and may also be provided with reference lines to ensure the accuracy of the system.

Figure 6:
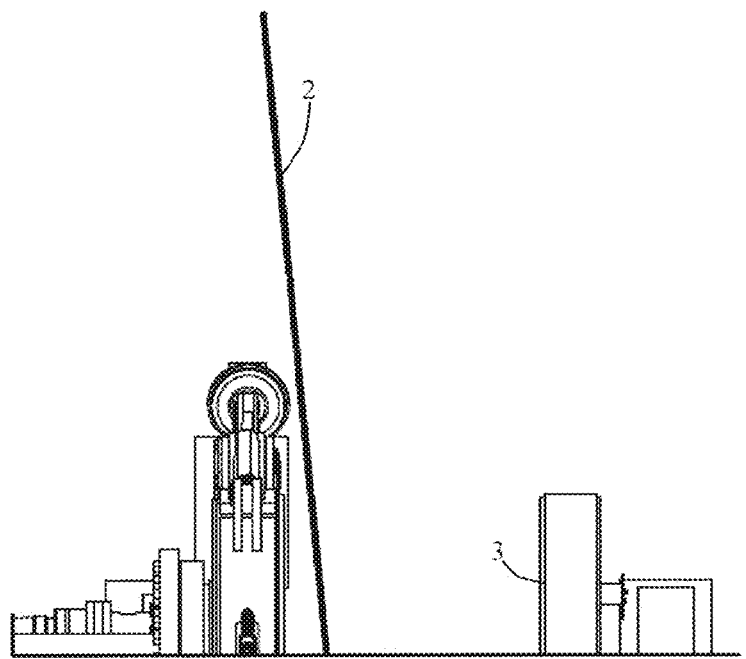
FIG. 6 illustrates the field of view from the camera according to an embodiment of the invention.

As is illustrated in FIG. 6 the field of view from the camera does not necessarily cover the drum 3, being adapted to find the cable path to the drum. As such the cable, anchor etc may simply pass the drum using as a support for loading or unloading it, but winding it on a spool or similar further along the cable.

Thus to summarize the main embodiment invention relates to a system for controlling the loading or unloading a cable or the like onto a drum, wherein the drum has a known first rotation axis loading or unloading the cable, the system also comprises an imaging means aimed at the cable from a position at a distance from the drum rotation axis, the imaging means being adapted to measure the direction of the cable relative to the rotational axis of the drum. The cable in this understanding may be of different types, such as cables connected to seismic streamers, but may also include anchor chains, lifting lines (fibre rope, steel wire rope or umbilical), the system and especially imaging means being adapted to be able to detect the coordinates of at least one point of the cable, chain etc, relative to the drum.

The loading and unloading may comprise a winch, especially when used on cables, but other means, e.g. when used on anchor chains, may also be contemplated. The drum will in those cases be adapted to the nature of the cable, chain etc to be loaded/unloaded.

Preferably the imaging means is adapted to provide a 3D image, thus being able to provide the direction of the cable in three dimensions by finding the vector of the cable in three dimensions or by finding the coordinates of one or more positions along the cable.

For improving the image contrast at least one background surface positioned on the opposite side of the cable from the imaging means, said background surface having a contrast colour relative to the cable colour.

The imaging means may be positioned at a distance from both the axis of the drum and the axis of the cable, and may be constituted by one or two video cameras monitoring the movement of the cable or single frame cameras providing a sequence of images thus being able to detect and monitor changes in the cable direction as a function of time. Thus the rate of change may be taken into account in controlling the drum orientation and management.

The system is preferably mounted on a pivotable platform being rotatable relative to a second axis being essentially perpendicular to said first axis, wherein the system comprises control means for rotating the platform relative to the second axis so as to maintain an essentially perpendicular relation between said drum rotation axis and said cable direction.

An alternative application of the system is to measure the position of a cable relative to the deck comprising 3D imaging means being adapted to detect the position and orientation of the cable in three dimensions, e.g. positioned on an anchor handling vessel and to transmit this information as input to a control system monitoring the stability of the vessel. The cable in this case may be a chain or a steel wire.

The invention claimed is:

1. A system for controlling the loading or unloading a cable onto a drum, the system comprising:
   wherein the drum has a known first rotation axis loading or unloading the cable;
   an imaging means aimed at the cable from a position at a distance from the drum rotation axis;
   wherein the imaging means is adapted to measure the direction of the cable relative to the rotational axis of the drum;
   wherein the imaging means is adapted to provide a 3D image, thus being able to provide the direction of the cable in three dimensions;
   wherein the system is mounted on a platform being rotatable relative to a second axis being essentially perpendicular to the first axis; and
   wherein the system positions the platform to maintain a substantially perpendicular relation between the drum rotation axis and the cable direction.

2. The system according to claim 1, wherein the cable is a lifting line.

3. The system according to claim 1, wherein the cable is connected to a seismic streamer cable.

4. The system according to claim 1, including at least one background surface positioned on the opposite side of the cable from the imaging means, the background surface having a contrast colour relative to the cable colour.

5. The system according to claim 1, wherein the imaging means is positioned at a distance from both the axis of the drum and the axis of the cable.

6. The system according to claim 1, wherein the imaging means is constituted by a video camera monitoring the movement of the cable.

7. The system according claim 1, comprising a winch for loading and unloading the cable or the like.

8. A system for monitoring the position of cable relative to the deck of a vessel and controlling the loading or unloading the cable onto a drum, the system comprising:
   wherein the drum has a known first rotation axis loading or unloading the cable;
   an imaging means aimed at the cable from a position at a distance from the drum rotation axis;
   wherein the imaging means is adapted to measure the direction of the cable relative to the rotational axis of the drum; and
   wherein the imaging means comprises two cameras adapted to provide a 3D image, thus being able to measure x, y, and z coordinates of the cable relative to the drum rotation axis and a drum position and thus the direction of the cable in three dimensions.

9. The system according to claim 8, wherein the cable is selected from the group consisting of a fibre rope, a chain and a steel wire.

10. The system according to claim 8, wherein the system provides information for stability monitoring of the vessel.

* * * * *